March 14, 1972 A. J. PETERSEN ET AL 3,649,506
SOLID STATE GLASS ELECTRODE
Filed Oct. 14, 1969

INVENTORS
ARNE J. PETERSEN
GEORGE MATSUYAMA
BY *Thomas L. Peterson*

3,649,506
SOLID STATE GLASS ELECTRODE
Arne J. Petersen, Balboa, and George Matsuyama, Fullerton, Calif., assignors to Beckman Instruments, Inc.
Filed Oct. 14, 1969, Ser. No. 866,249
Int. Cl. G01n 27/36
U.S. Cl. 204—195                 10 Claims

ABSTRACT OF THE DISCLOSURE

A solid state glass electrode in which a conductor having a surface layer of an electrochemically active metal is coated with a first coating of a mixture of a glass and a halide of the active metal and a second outer coating of ion sensitive glass. The preferred active metal and halide are copper and cuprous chloride, respectively. The electrode is rugged, has a response approximately that of a standard glass electrode and has better stability over long periods and changing temperature conditions than previous solid state glass electrodes.

BACKGROUND OF THE INVENTION

Field of the invention

The present invention relates to a glass electrode and a method of making the same and, more particularly, to a solid state glass electrode for making ion potential measurements and the method of making such an electrode.

Description of the prior art

The conventional glass electrode used for determining the ion concentration of solutions comprises a tube or stem or non-conducting glass closed at its lower end by an ion sensitive glass membrane, usually in the shape of a bulb. Typically an internal half cell, such as one formed of a silver wire having a silver chloride coating thereon, is positioned in the tube so as to contact an electrolyte filling the lower portion of the tube and the ion sensitive glass bulb. Such electrodes are usually somewhat fragile and are sensitive to elevated temperatures and pressures. At elevated temperatures the electrolyte may boil thus disrupting the operability of the electrode, while at high pressures the glass tubing or ion sensitive bulb may crack due to lack of structural strength. Additionally, the typical glass electrode is difficult to miniaturize as would be desired to provide a micro glass electrode suitable for use in the biological and medical fields.

Solid state glass electrodes have been constructed in the past in which the electrolyte has been eliminated by coating a suitable metal wire with a film of ion sensitive glass. Such an electrode is described in detail in an article by M. R. Thompson entitled "A Metal Connected Glass Electrode," U.S. National Bureau of Standards Journal of Research, vol. 9, 1932, pp. 833 to 852. Another form of solid state glass electrode is described in British Pat. 1,018,024. This electrode is made by superficially oxidizing a copper wire and thereafter applying a coating of ion sensitive glass to the oxidized surface. It is stated in the patent that such an electrode has greater stability than that of an electrode in which a metal wire is directly coated with a layer of ion sensitive glass. By stability, reference is made to the ability of a glass electrode to produce a substantially constant millivolt response over time and changing temperature conditions.

SUMMARY OF THE INVENTION

It is the principal object of the present invention to provide an improved solid state glass electrode.

Another object of the invention is to provide a solid state glass electrode which produces a stable electrical output over time and varying temperature conditions without loss of sensitivity.

According to the principal aspect of the present invention, we have discovered that if an intermediate layer of a mixture of glass and a halide of an electrochemically active metal is provided between the metal contact or conductor and the outer coating of ion sensitive glass of a solid state glass electrode, the electrode will be rugged, and will produce a relatively stable electrical output over time and under varying temperature conditions without a loss in sensitivity to changing ion concentrations of test solutions.

DESCRIPTION OF THE PREFERRED EMBODIMENTS

According to the invention, we have found that a solid state glass electrode may be formed having good response and electrical stability characteristics by providing between a conductor having a surface layer of an electrochemically active metal and the outer layer of ion sensitive glass an intermediate layer or coating comprised of a glass having a halide of such active metal incorporated therein. Examples of suitable electrochemically active metals which may be utilized in the electrode of the present invention are copper, silver, cobalt and cadmium while suitable halides of such metals which may be used are chloride, iodide and bromide. As will appear later, the preferred electrode of the present invention is one having an internal metal contact of copper, an intermediate layer formed of a mixture of ion sensitive glass and cuprous chloride, and an outer layer or coating formed of pH sensitive glass. It is to be understood, however, that the present invention is not limited to the use of hydrogen ion sensitive glasses, but may utilize other forms of ion sensitive glasses, such as cationic and sodium ion sensitive glasses.

Figure 1:
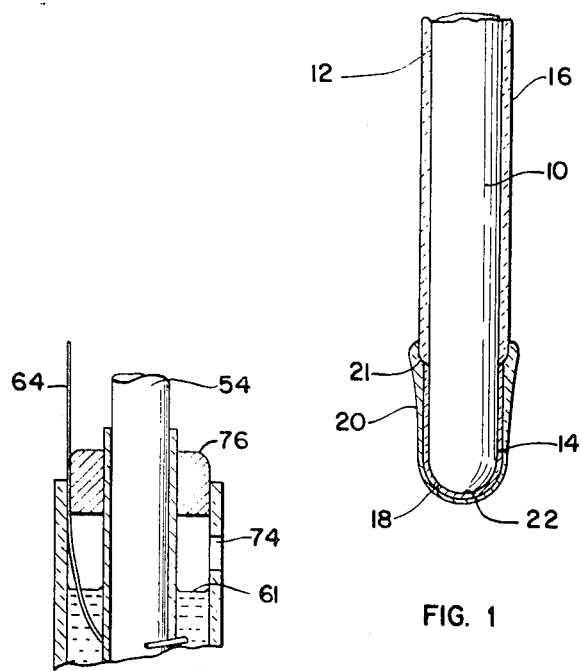
FIG. 1 is a fragmentary sectional view of the sensing end of one electrode constructed in accordance with the present invention, shown greatly enlarged.

Referring now to FIG. 1 of the drawing, there is shown one embodiment of the present invention comprising an elongated metal conductor 10 having an upper portion generally designated 12 and a lower portion generally designated 14. Disposed upon the upper portion 12 of the metal conductor is an electrical insulating coating 16 and disposed about and sealed to the lower portion 14 of the conductor is a coating 18 of glass mixed with a halide of a metal the same as that of the conductor. Sealed to and coating the layer 18 and the terminal end of the insulating coating 16 is an ion sensitive glass coating 20 which forms the ion sensitive membrane of the electrode.

The metal conductor 10 may be formed of an electrochemically active metal, such as any one of those mentioned above, and preferably has a coefficient of thermal expansion close to that of the electrical insulating layer 16. In the preferred form of the invention, the conductor 10 is a metal wire while the electrical insulating coating 16 may be a nonconductive glass tube or capillary which is sealed to the wire 10. The upper portion 12 of this wire may be connected to a suitable cable (not shown) for coupling the electrode to a high impedance amplifier, such as a conventional pH meter.

For reasons to be explained later, the end 22 of the lower portion 14 of the metal conductor is rounded by any convenient method such as by grinding, bending the end of the wire upwards to leave the lowest most portion a smooth curve, or by heating the end to form a smooth spherical bead.

The glass employed in the coating 18 may be a nonconductive glass or an ion sensitive glass, such as the same ion sensitive glass which is employed to form the outer layer or membrane 20. The use of an ion sensitive glass in the coating 18 has the advantage that the resulting electrode has a lower electrical resistance than when nonconductive glass is used in the coating.

In general, the method of manufacturing the electrode illustrated in FIG. 1 comprises the steps of coating the upper portion 12 of the metal conductor 10 with the insulating coating 16, sealing a coating or layer comprising a glass mixed with a halide of the metal conductor to the lower portion 14 of the conductor and, finally, coating the layer 18 with an ion sensitive glass.

In more detail, the insulating coating 16 for the conductor 12 may be formed by surrounding the conductor 10, except for its lower portion 14, by a capillary glass tube which has a coefficient of thermal expansion similar to that of the conductor 12. The tube is then heated so that it will shrink or collapse upon cooling, and thus seal against the outer surface of the conductor 10. Thereafter, a glass, which may be ion sensitive glass, is mixed with a halide of the metal conductor and is applied to the exposed lower portion 14 of the conductor. The coating 18 may be applied by any convenient method. One of such methods is the mixing of powdered glass and salt, depositing such mixture upon the exposed end 14 of the conductor, fusing the mixture in a flame and then allowing the coating thus formed to cool and solidify. A second method is the mixing of the powdered glass and metal halide, heating the mixture until it is molten, dipping the lower portion 14 of the conductor into the molten mixture and then allowing the same to cool. By either of these two methods, it has been found that the salt employed in the coating 18 is uniformly distributed throughout the glass utilized in the coating. The weight percentage of salt to glass in the prefusion mixture then forms the coating 18 is preferably within the range of about 0.05% to 2.0%. This ensures a sufficient amount of salt in the coating to make the coating a good electrical conductor and thus capable of functioning as an internal half cell.

The ion sensitive glass membrane or coating 20 is then formed over the coating 18 by dipping the coated lower portion 14 of the conductor 10 into a molten bath of ion sensitive glass up to a level slightly above the lower end 21 of the insulating layer 16. The end of the conductor should remain disposed in the molten ion sensitive glass for a time sufficient to wet the coating 18. Then the conductor is removed from the molten bath of ion sensitive glass and the glass coating formed on the layer 18 is then allowed to cool and solidify. It has been found that by rounding the end 22 of the conductor as discussed above the glass 20, upon solidification, pulls away from the end of the conductor thus leaving an extremely thin membrane or film, thus minimizing the electrical resistance of the electrode.

Figure 2:
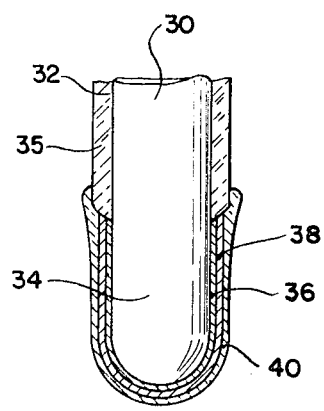
FIG. 2 is a fragmentary sectional view of the sensing end of another electrode embodying the features of the invention, also shown greatly enlarged.

In practice, it is difficult to find suitable insulating materials for the conductor 12 which have coefficients of thermal expansion matching that of the conductor so that the insulating coating will not crack or otherwise fail over a wide range of temperatures. To overcome this problem, the embodiment illustrated in FIG. 2 is provided. In this embodiment, there is provided an elongated metal conductor 30, preferably a metal wire, having an upper portion designated 32 and a lower portion designated 34. Disposed about and sealed to the upper portion of the conductor 30 is an electrical insulating coating 35. The exposed lower portion 34 of the conductor is coated with a layer of metal 36 upon which is sealed a second coating 38 which is comprised of a glass mixed with a halide of the metal coating 36, like the layer 18 in the embodiment illustrated in FIG. 1. Covering the coating 38 is an ion sensitive glass membrane coating 40.

The conductor 30 is formed of a metal, such as platinum, for which there is readily available electrical insulating materials having a coefficient of thermal expansion closely matching that of the metal. For example, lead glasses, such as Corning 0120 or Kimble KG-12, have coefficients of thermal expansion closely matching that of platinum. By using such glasses as the insulating coating 36 for the wire 30, the resulting electrode may be subjected to a wide variety of temperature conditions without cracks forming in the glass coating. Since platinum is not a sufficiently electrochemically active metal to be utilized for direct metal contact to the glass-salt coating 38, the lower end 34 of the conductor 30 is plated with a more active metal, such as those discussed above in connection with the metal which forms the conductor 10. The coating 38 of glass and salt is identical to that described for coating 18 in FIG. 1 with the salt being chosen to correspond to the plated metal 36 rather than the conductor 30. For example, if silver is used as the metal coating 36, it is preferred that silver chloride be used as the salt in the coating 38, or if copper is the plating metal then cuprous chloride should be utilized in the coating 38.

To construct the electrode illustrated in FIG. 2, the upper portion 32 of the platinum wire 30 is surrounded by a capillary tube of a glass, such as Corning 0120 or Kimble KG-12 or the like, which is sealable to platinum. The tube is heated to a sufficiently high temperature to cause it to shrink and seal onto the platinum wire 30 upon cooling to room temperature. Thereafter, the lower portion 34 of the platinum wire is plated with an active metal by electroplating or dipping the end 34 of the wire in an oxide of the active metal and fusing the same in a flame. A halide of such metal is then mixed with a suitable glass and applied to the metal coated platinum wire in the manner discussed above. The ion sensitive glass layer 40 is then formed over the coating 38 as hereinbefore described. Hence, at the lower portion of the conductor four layers are sealed each to the layer or layers adjacent to it thereby providing a rugged, compact electrode having the ability to withstand high temperatures and pressures.

Figure 3:
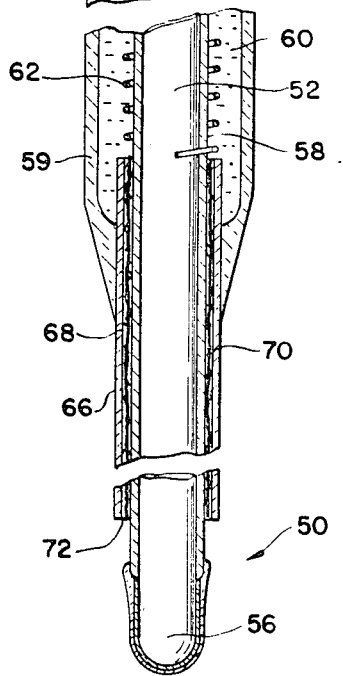
FIG. 3 is a fragmentary, enlarged sectional view of a further embodiment of the invention in the form of a combination glass-reference electrode.

Reference is now made to FIG. 3 wherein another embodiment of the invention is illustrated in the form of a combination electrode, that is, an electrode which has a sensing portion as well as a reference portion. The sensing portion designated 50 has the same construction as either of the electrodes illustrated in FIG. 1 or 2. As shown, the electrode 50 includes a metal conductor 52 having an upper portion 54 and a lower portion 56. An electrical insulating material 58 covers the upper portion 54, while the requisite layers are applied to the lower portion 56 as discussed above in connection with FIGS. 1 and 2. Disposed about the insulating layer 58 is a tube 59 of nonconductive material, such as a nonconductive lead glass. This tube is spaced from the electrical insulating layer 58 so that an annular space 60 is formed between the walls of the tube and the insulating layer. The space 60 is filled with a reference electrode electrolyte 61 which may be any one of the types normally used and well known to those skilled in the art. An internal half cell comprising a silver wire 62 coated with silver chloride is disposed in the space 60 and wound about the insulated conductor 52. One end 64 of the wire 62 extends beyond the electrode and is adapted to be connected to a pH meter [not shown] together with the conductor 52. An elongated nonconductive glass capillary tube 66 surrounds and is spaced from the insulated conductor 52. This tube extends from within the space 60 to just adjacent the lower portion 56 of conductor 52. The tube 66 is spaced slightly from the insulated conductor so that a narrow annular passage 68 is formed therebetween. This passage is occupied by longitudinally extending fibers 70, such as quartz roving or asbestos fibers, which form the liquid junction for the electrolyte within the chamber 60. An opening 74 in the tube 59 is provided so that electrolyte may be selectively added to the chamber 60 as electrolyte is dissipated through the liquid junction. A plug 76 at the upper end of the tube 59 closes the upper portion of the chamber 60.

To manufacture the combination electrode illustrated in FIG. 3, the sensing portion may be made as already described above. In addition, the capillary tube 66 containing quartz fibers 70 or the like is disposed about the insulated conductor 52 and is heated to collapse about the fibers and seal the same into position between the inner wall of the glass tube 62 and the insulated conductor 52. Then the lower end of the glass tube 59 is sealed to the glass capillary 66. The internal half cell 62 is then mounted in the reservoir 60 and the upper end of the assembly is closed by the plug 76. A combination electrode has been successfully constructed as shown in FIG. 3 utilizing a glass tube 62 having an outer diameter of about 3.5 mm. and with the capillary tube 66 having an outer diameter of less than about 1 mm.

Four electrodes constructed in accordance with the teachings of the present invention have been tested, together with a conventional glass electrode and an electrode as disclosed in the aforementioned British patent, in various test solutions, at different temperatures and over a period of some three days. Each electrode was coupled with a standard reference electrode to a conventional pH meter. The results of these tests appear in Table I below.

TABLE I

| | A | | | | B | | | | C | | | |
|---|---|---|---|---|---|---|---|---|---|---|---|---|
| | Cu—1% Cu$_2$Cl$_2$ | | | | Standard glass electrode | | | | Cu—Oxide | | | |
| | pH 4 | | pH 7.41 | | pH 4 | | pH 7.41 | | pH 4 | | pH 7.41 | |
| Time | 25° | 40° | 25° | 40° | 25° | 40° | 25° | 40° | 25° | 40° | 25° | 40° |
| 1st day | +120 | | −90 | | +173 | | −27 | | +180 | | −22 | |
| | | +111 | | −96 | | +175 | | −29 | | +145 | | −68 |
| | | +112 | | −100 | | +178 | | −30 | | +135 | | −72 |
| | +120 | | −80 | | +178 | | −22 | | | | | |
| | +120 | | | | | | | | | +142 | | −52 |
| 2nd day | | | −79 | | | | +172 | | −28 | +140 | | −60 | |
| | | +112 | | −95 | | +175 | | −32 | | +118 | | −89 |
| | | +115 | | −92 | | +175 | | −30 | | +108 | | −80 |
| | | +115 | | −92 | | | | −30 | | +122 | | −85 |
| | +119 | | −80 | | +178 | | −20 | | +121 | | −70 | |
| 3rd day | +119 | | −80 | | +170 | +172 | | −28 | +128 | | −68 | |
| | | +110 | | −99 | | +178 | | −30 | | +108 | | −100 |
| | | +110 | | −92 | | +178 | | −29 | | +112 | | −94 |
| | | +111 | | −95 | | | | −29 | | +112 | | −92 |
| | +122 | | −78 | | +178 | | −20 | | +128 | | −50 | |
| X | 3 | 5 | 12 | 8 | 8 | 6 | 8 | 3 | 59 | 37 | 48 | 32 |
| Y | 11 | | 20 | | 6 | | 10 | | 35 | | 46 | |

| | D | | | | E | | | | F | | | |
|---|---|---|---|---|---|---|---|---|---|---|---|---|
| | Co—1% CoCl$_2$ | | | | Cd—1% CdCl$_2$ | | | | Ag—1% AgCl$_2$ | | | |
| | pH 4 | | pH 7.41 | | pH 4 | | pH 7.41 | | pH 4 | | pH 7.41 | |
| Time | 25° | 40° | 25° | 40° | 25° | 40° | 25° | 40° | 25° | 40° | 25° | 40° |
| 1st day | +232 | | +38 | | −168 | | −360 | | +275 | | +78 | |
| | | +218 | | +18 | | −183 | | −391 | | | | | |
| | | +215 | | +18 | | −185 | | −392 | +258 | | +61 | |
| | +232 | | +38 | | −178 | | −372 | | | | | |
| 2nd day | +228 | | +38 | | −178 | | −375 | | | | | |
| | | +218 | | +20 | | −191 | | −398 | | +249 | | +40 |
| | | +221 | | +21 | | −192 | | −400 | | +249 | | +42 |
| | | +200 | | +20 | | −191 | | −398 | | +238 | | +62 |
| | +232 | | +38 | | −180 | | −378 | | +273 | | +78 | |
| 3rd day | +220 | | +42 | | −180 | | −380 | | | | | |
| | | +218 | | +20 | | −192 | | −398 | | | | |
| | | +220 | | +20 | | −192 | | −399 | | | | |
| | | | | +23 | | −198 | | −400 | | | | |
| | +240 | | +42 | | −180 | | −380 | | | | | |
| X | 12 | 5 | 4 | 5 | 12 | 15 | 20 | 9 | 17 | 11 | 17 | 22 |
| Y | 20 | | 20 | | 18 | | 31 | | 35 | | 21 | |

As will be noted, the above Table I is divided into six columns, designated by the letters A, B, C, D, E and F, one for each electrode tested. The terms "pH 4" and pH 7.41" in the table have reference to the hydrogen ion concentrations of two sets of test solutions to which each of the electrodes were subjected. The terms 25° and 40° under each of the columns indicate the temperature in degrees centigrade of the test solutions. The positive and negative figures under each "temperature" column are the actual millivolt output readings of the electrodes. The left hand column entitled "time" has reference to a period of three days over which the electrodes were tested in the test solutions. The figures in the horizontal rows designated X indicate the deviation in millivolt readings of the electrodes over the three day period of time that the electrodes were tested, while the figures in the horizontal rows designated Y indicate the maximum change in mllivolt response of the electrodes when shifted from the 25° test solutions to the 40° test solutions. The test data under column A are for an electrode like that illustrated in FIG. 2 in which the wire 30 was formed of platinum, the metal coating 36 was formed of copper, the coating 38 was formed of a mixture of hydrogen ion sensitive glass and 1% by weight of cuprous chloride, and the outer coating 40 was formed of the same glass as used in the coating 38. The test data appearing under column B are for a conventional glass electrode having an ion sensitive bulb formed of a glass which was the same as the glass utilized in the layers 38 and 40 for electrode A. The data under column C are for an electrode constructed in accordance with the teachings of the aforementioned British patent, employing the same ion sensitive glass as in the other electrodes discussed herein. The data appearing under columns D, E and F are for electrodes similar to electrode A but employing a different active metal and salt. In the electrode designated D the electrochemically active metal was cobalt and the layer 38 a mixture of hydrogen ion sensive glass and 1% by weight of cobalt chloride. In the electrode designated E the active metal was cadmium and the layer 38 a mixture of the aforementioned ion sensitive glass and 1% by weight cadmium chloride. In the electrode designated F the active metal was silver and the layer 38 a mixture of ion sensitive glass and 1% by weight silver chloride.

The theoretical response for any of the electrodes discussed above would be 201.4 millivolts at 25° and 207.8 millivolts for 40°. It is seen from the data appearing in Table I that all the electrodes produced close to theoretical response. In comparing the stability of the electrodes, it is seen that the copper-1% cuprous chloride electrode had a stability in electrical output over a three day period of time and changing temperature conditions closely approximating that of the standard glass electrode B. While the stability of the electrodes designated D, E and F was not quite as favorable as the electrode designated A, it is seen that the former electrodes were substantially more stable than the electrode constructed in accordance with the teachings of the aforementioned British patent, the data for which appears under column C. Thus, by the provision of an intermediate layer formed of a glass having a halide of active metal incorporated therein between the active metal surface layer and ion sensitive coating, substantially greater stability is achieved than that by the prior art British electrode, and the stability of the preferred electrode of the present invention, i.e., the electrode utilizing copper and 1% cuprous chloride in the coating 38, has a stability close to that of a standard glass electrode.

Although several embodiments of the invention have been disclosed herein for purposes of illustration, it will be understood that various changes can be made in the form, details and arrangement of the various parts and in the materials and proportions of the various materials in such embodiments without departing from the spirit and scope of the invention as defined by the appended claims.

What is claimed is:

1. A glass electrode for measuring the ion concentration of solutions comprising:
   an elongated metal conductor;
   said conductor having at one end thereof a surface layer of an electrochemically active metal;
   a first coating covering said layer, said coating comprising a glass having a salt uniformly distributed therethrough, said salt being a halide of said active metal; and
   a second coating of ion sensitive glass covering said first coating.

2. An electrode as set forth in claim 1 wherein:
   said surface layer of active metal is provided by a separate coating covering said one end of said conductor;
   said conductor being formed of a metal other than said active metal; and
   an insulating coating covering said conductor except for said one end thereof and having a coefficient of thermal expansion closely matching that of said conductor.

3. An electrode as set forth in claim 2 wherein:
   said conductor is a platinum wire; and
   said insulating coating is glass.

4. An electrode as set forth in claim 1 wherein said active metal is selected from the group consisting of copper, silver, cobalt and cadmium.

5. An electrode as set forth in claim 1 wherein said salt is a chloride salt.

6. An electrode as set forth in claim 1 wherein said active metal is copper and said salt is cuprous chloride.

7. An electrode as set forth in claim 1 wherein:
   the end of said conductor is rounded.

8. An electrode as set forth in claim 1 wherein:
   said glass of said first coating is the same as said ion sensitive glass.

9. A glass electrode for measuring the ion concentration of solutions comprising:
   an elongated metal conductor;
   said conductor having at one end thereof a surface layer of an electrochemically active metal;
   a first coating covering said layer, said coating comprising a glass having a salt uniformly distributed therethrough, said salt being a halide of said active metal;
   a second coating of ion sensitive glass covering said first coating;
   a glass insulating coating covering said conductor except for said one end thereof;
   a first glass tube surrounding said conductor adjacent to said one end thereof, said tube being closely spaced from said glass insulating coating to define a restricted annular passage therebetween;
   at least one strand of inert material extending the length of said passage and being retained therein by the opposed surfaces of said first glass tube and said glass insulating coating so as to provide a liquid junction;
   a second glass tube surrounding said conductor adjacent to the other end thereof, the end of said second glass tube adjacent to said first glass tube being fused thereto, said second glass tube being spaced from said glass insulating coating to provide an annular electrolyte reservoir therebetween;
   an internal half cell positioned in said reservoir; and
   means sealing the other end of said second glass tube to said glass insulating coating.

9

10. An electrode as set forth in claim 9 wherein:
said conductor is a metal wire; and
said first glass tube is an elongated capillary tubing.

References Cited

UNITED STATES PATENTS

| | | | |
|---|---|---|---|
| 3,306,837 | 2/1967 | Riseman et al. | 204—195 |
| 3,498,901 | 3/1970 | Metz et al. | 204—195 |
| 3,049,118 | 8/1962 | Arthur et al. | 204—195 X |
| 2,755,243 | 7/1956 | Beckman et al. | 204—195 |
| 3,103,480 | 9/1963 | Watanabe et al. | 204—195 |

FOREIGN PATENTS 587,967  5/1947  Great Britain _____ 204—195

GERALD L. KAPLAN, Primary Examiner

U.S. Cl. X.R.

65—59